United States Patent
Bergquist

(10) Patent No.: US 10,527,770 B2
(45) Date of Patent: Jan. 7, 2020

(54) LIGHT CONVERSION ELEMENT

(71) Applicant: Nokia Technologies Oy, Espoo (FI)

(72) Inventor: Johan Bergquist, Tokyo (JP)

(73) Assignee: Nokia Technologies Oy, Espoo (FI)

( * ) Notice: Subject to any disclaimer, the term of this patent is extended or adjusted under 35 U.S.C. 154(b) by 179 days.

(21) Appl. No.: 15/541,761

(22) PCT Filed: Dec. 28, 2015

(86) PCT No.: PCT/FI2015/050945
§ 371 (c)(1),
(2) Date: Jul. 6, 2017

(87) PCT Pub. No.: WO2016/110611
PCT Pub. Date: Jul. 14, 2016

(65) Prior Publication Data
US 2018/0003877 A1    Jan. 4, 2018

(30) Foreign Application Priority Data

Jan. 8, 2015    (EP) .................................... 15150398

(51) Int. Cl.
*G02F 1/1335*    (2006.01)
*F21V 8/00*    (2006.01)
*G02F 1/13357*    (2006.01)

(52) U.S. Cl.
CPC ......... *G02B 6/0005* (2013.01); *G02B 6/0003* (2013.01); *G02F 1/133606* (2013.01); *G02F 2001/133607* (2013.01); *G02F 2001/133614* (2013.01)

(58) Field of Classification Search
CPC ................ G02B 6/0003; G02B 6/0005; G02F 1/133603; G02F 1/133606; G02F 1/133621; G02F 2001/133607; G02F 2001/133614; G09F 9/305
See application file for complete search history.

(56) References Cited

U.S. PATENT DOCUMENTS

| 4,264,408 A | 4/1981 | Benham ......................... 156/629 |
| 4,647,811 A | 3/1987 | Galves et al. ................ 313/372 |
| 5,053,765 A * | 10/1991 | Sonehara ................. G02B 6/06 340/815.43 |
| 5,469,186 A | 11/1995 | Tanaka et al. .................. 345/32 |

(Continued)

FOREIGN PATENT DOCUMENTS

| EP | 2711768 A1 | 3/2014 |
| JP | H03-136089 A | 6/1991 |

(Continued)

*Primary Examiner* — Tsion Tumebo
(74) *Attorney, Agent, or Firm* — Harrington & Smith

(57) ABSTRACT

An apparatus including a light conversion element including an input interface for receiving input light; an output interface for providing output light having at least one different, lower frequency than the input light; and a plurality of light guides extending between the input interface and the output interface that suspend down-conversion material at remote locations from the input interface, wherein the down-conversion material is configured to down-convert the received input light to produce the provided output light of lower frequency or frequencies.

14 Claims, 3 Drawing Sheets

(56) References Cited

U.S. PATENT DOCUMENTS

| | | | |
|---|---|---|---|
| 5,544,268 A * | 8/1996 | Bischel | G02F 1/011 |
| | | | 385/16 |
| 6,005,239 A | 12/1999 | Suzuki et al. | 250/214 VT |
| 8,733,960 B2 * | 5/2014 | Seetzen | G02F 1/133605 |
| | | | 362/231 |
| 9,343,494 B2 * | 5/2016 | Lee | H01L 27/14629 |
| 2003/0002832 A1 * | 1/2003 | Lowry | G02B 6/06 |
| | | | 385/120 |
| 2004/0252867 A1 * | 12/2004 | Lan | G06K 9/0004 |
| | | | 382/124 |
| 2006/0291203 A1 * | 12/2006 | Anandan | G02B 6/0043 |
| | | | 362/231 |
| 2009/0080215 A1 | 3/2009 | Anandan | 362/606 |
| 2010/0002414 A1 * | 1/2010 | Meir | G02B 6/0021 |
| | | | 362/84 |
| 2010/0141572 A1 * | 6/2010 | Kamada | G02B 6/0008 |
| | | | 345/102 |

FOREIGN PATENT DOCUMENTS

| | | |
|---|---|---|
| JP | H05-157916 A | 6/1993 |
| JP | 2007-193234 A | 8/2007 |

* cited by examiner

LIGHT CONVERSION ELEMENT

TECHNOLOGICAL FIELD

Embodiments of the present invention relate to a light conversion element and a method of manufacturing a light conversion element. In particular, they relate to a light conversion element comprising down-conversion material.

BACKGROUND

There is a demand for the production of displays that have a high resolution. These displays, when small scale, may be used as near eye displays and projector displays.

BRIEF SUMMARY

According to various, but not necessarily all, embodiments of the invention there is provided an apparatus comprising: a light conversion element comprising: an input interface for receiving input light; an output interface for providing output light having at least one different, lower frequency than the input light; and a plurality of light guides extending between the input interface and the output interface that suspend down-conversion material at remote locations from the input interface, wherein the down-conversion material is configured to down-convert the received input light to produce the provided output light of lower frequency or frequencies.

According to various, but not necessarily all, embodiments of the invention there is provided examples as claimed in the appended claims.

BRIEF DESCRIPTION

For a better understanding of various examples that are useful for understanding the brief description, reference will now be made by way of example only to the accompanying drawings in which.

DETAILED DESCRIPTION

Figures 1, 2:
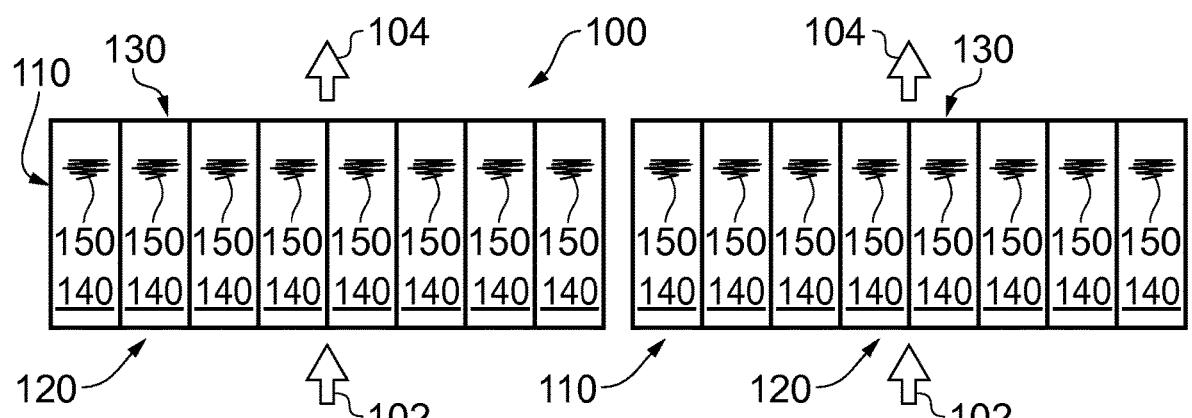
FIG. 1 illustrates a cross-section of an example of a light conversion element.
FIG. 2 illustrates a different cross-section of the example of a light conversion element.

The examples described below use a light conversion element 110 that suspends down-conversion material 150 at remote locations from an input interface 120 of the light conversion element 110. The remote location of the suspended down-conversion material 150 from the input interface 120 thermally insulates the down-conversion material from a source of light at the input interface 120. This enables the use of down-conversion material 150 in the manufacture of the light conversion element 110 and the use of the light conversion element 110 in high resolution, small-scale displays.

The figures illustrate an apparatus 100 comprising: a light conversion element 110 comprising: an input interface 120 for receiving input light 102; an output interface 130 for providing output light 104 having at least one different, lower frequency that the input light 102; and a plurality of light guides 140 extending between the input interface 120 and the output interface 130 that suspend down-conversion material 150 at remote locations from the input interface 120, wherein the down conversion material 150 is configured to down-convert the received input light 102 to produce the provided output light 104 of lower frequency or frequencies.

An emission spectrum of light produced is controlled by at least a composition and concentration of the down-conversion material 150.

In some, but not necessarily all examples, the plurality of light guides 140 may suspend the same down-conversion material at remote locations from the input interface 120. This will produce a monochromatic display.

In some, but not necessarily all examples, the plurality of light guides 140 suspend different down-conversion material 150 at remote locations from the input interface 120. The different compositions of the down-conversion material 150 provide different spectra of output light 104.

In some but not necessarily all examples the output light comprises or consists of visible light.

In some but not necessarily all examples the output light comprises or consists of infrared light.

Figure 3:
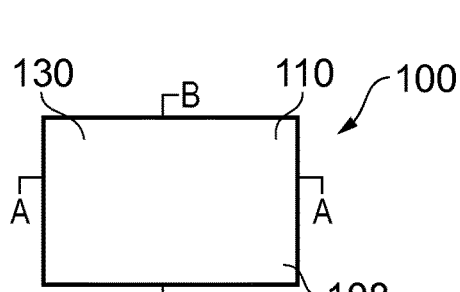
FIG. 3 illustrates a plan view of the example of a light conversion element.

One or more light guides 140 may be used to create a pixel or sub-pixel of a display 108, for example as illustrated in FIG. 3.

FIG. 1 illustrates a cross-section along the line A-A of FIG. 3 and FIG. 2 represents a cross-section along the line B-B of FIG. 3.

In FIGS. 1 to 3, the apparatus 100 comprises a light conversion element 110. The light conversion element 110 comprises an input interface 120 for receiving input light 102, an output interface 130 for providing output light 104 having at least one different, lower frequency than input light 102; and a plurality of light guides 140 extending between the input interface 120 and the output interface 130 that suspend down-conversion material 150 at remote locations from the input interface 120. The down-conversion material 150 is configured to down-convert the received input light 120 to produce the provided output light 104 of lower frequency or frequencies.

The display 108 comprises a plurality of pixels or sub-pixels at the output interface 130 of the light conversion element 110. An emission spectrum of light produced by a pixel is controlled by at least a composition of the down-conversion material 150 associated with that pixel.

The apparatus 100 may comprise a plurality of different composition. Different down-conversion material 150 may be associated with different pixels or sub-pixels. Each cavity may contain a plurality of different compositions.

The down-conversion material 150 may comprise phosphors and/or quantum dots, or nanocrystals with low-dimensional quantum confinement of photo-induced excitons. However, such down-conversion material 150 may be thermally sensitive and/or thermally degraded and/or toxic and therefore require hermetical sealing The size distribution of an ensemble of quantum dots may be used to control an emission spectrum of the quantum dot and the color of any visible output light 104 produced by the quantum dots is derived from that emission spectrum.

The concentration of the down-conversion material 150 may be used to control intensity of the output light 104 and/or the balance between down-converted light and residual input light.

In addition, mixtures of different down-conversion material 150 may be used. Where a mixture of two types of quantum dots are used, the emission spectrum of the combination depends on the relative level of concentration of the quantum dots. Increasing the total concentration increases the intensity up to a point where self-absorption quenches the emission. Therefore, there is an optimum value of the concentration which gives the highest conversion efficiency. Also, light emitted by one type of quantum dot may be absorbed by the other quantum dot. In this case, the two different types of dots may be separated into adjacent cavities all of which are illuminated by the same light source pixel.

The conversion efficiency of the down-conversion material 150 may not be 100 percent and therefore there may be some residual input light 102 that is transmitted by the down-conversion material 150 towards the output interface 130. Filtering at the output interface 130 may therefore, in some examples, be desirable to remove the input light 102 such that the light emitted from a light guide 140 at the output interface 130 comprises only the output light 104 produced by the down-conversion material 150 of that light guide 140.

Examples of materials that are suitable for the manufacture of quantum dots include cadmium selenide cadmium telluride, lead sulphide, indium phosphide and copper indium sulfide and/or silver indium sulfide. There may be environmental restrictions on the use of down-conversion material 150 formed from some materials, such as heavy-metal quantum dots formed from, for example, cadmium.

In FIGS. 1 and 2, the down-conversion material 150 is suspended to form pixels or sub-pixels of the pixelated display 108. It should, however, be appreciated that the examples given in FIGS. 1, 2 and 3 are merely examples and different geometries and arrangements are possible. For example, although the input interface 120 and the output interface 130 are illustrated as being parallel, in other examples, the input interface 120 and the output interface 130 may not be parallel. Likewise, although the interfaces between the light guides 140 are illustrated as being parallel, in other examples the interfaces between the light guides 140 may not be parallel. Although in the illustrated example the input interface 120 is planar and flat, in other examples it may be a curved plane or non-planar. Although in the examples illustrated the output interface 130 is planar and flat, in other examples the output interface 130 may be a curved plane or may be non-planar. Although in the examples illustrated the light guides 140 are illustrated as being straight (rectilinear) in other examples the light guides 140 may be curved or bent.

Figures 4, 5:
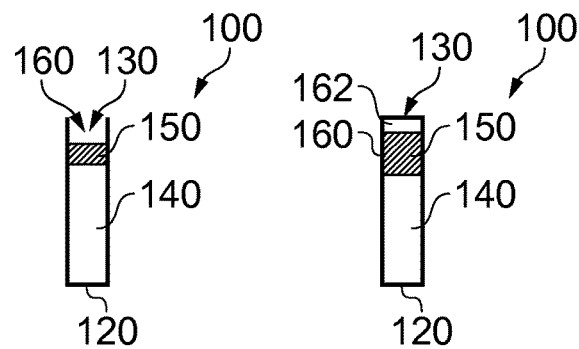
FIG. 4 illustrates an example of a light conversion element in which down-conversion material is housed in cavities in light guides.
FIG. 5 illustrates an example of a light conversion element in which the down-conversion material is housed in sealed cavities within the light guides.

FIG. 4 illustrates an example of the apparatus 100, for example as described previously, in which the down-conversion material 150 is housed in a cavity 160 in the light guide 140. The cavity 160 is removed from and is thermally insulated from the input interface 120. Each of the plurality of light guides 140 may have a similar cavity 160 that is remote from and thermally insulated from the input interface 120 and that suspends the down-conversion material 150 at that remote location.

FIG. 5 illustrates an example of the apparatus 100 similar to that illustrated in FIG. 4, however, in this example the cavities 160 comprising the down-conversion material 150 are sealed 162 to prevent or inhibit egress of the down-conversion material 150. In some examples, especially where it is required for environmental protection, the seal 162 to the cavity 160 is a hermetic seal. It is preferable for the hermetic sealing to be performed using a low-temperature process such as laser frit sealing at the edges of the apparatus 100.

Figure 6:
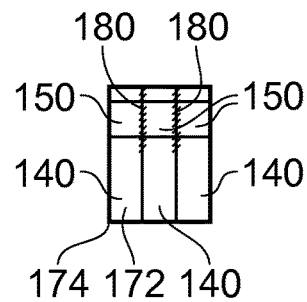
FIG. 6 illustrates an example of a light conversion element having light absorbing material positioned between the light guides of the light conversion element.

FIG. 6 illustrates an apparatus 100 similar to any of the previously described apparatus 100 where light absorbing material 180 is positioned between the light guides 140 so that it is located between the down-conversion material 150 of adjacent light guides 140. The light absorbing material 180 may be placed between the cavities 160 to optically isolate the cavities 160.

In the examples previously described, the light guide 140 will typically be formed in a core 172 that is surrounded by a clad 174. The core 172 has a lower refractive index than the clad 174. The absorbing material 180 may be part of or in addition to the clad 174 and may operate to provide extra-mural absorption (EMA).

Figure 7:
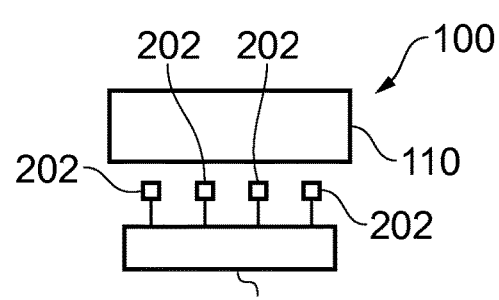
FIG. 7 illustrates an example of an apparatus comprising a light conversion element, light sources and a controller.

FIG. 7 illustrates an example of the apparatus 100 which comprises, in addition to the light conversion element 110 comprises light sources 202 and a controller 200 for controlling the light sources 202. In some embodiments the apparatus 100 may comprise only the light conversion element 110 and the light sources 202, the controller 200 being provided by a separate host apparatus.

Each of the light sources 202 is associated with one or more of the plurality of light guides 140. The light sources 202 are individually controllable, in this example, by the controller 200. The individual control may, for example, control an intensity of the light, whether the light source 202 is switched on or off and, in some examples, an optical frequency of the input light 102 produced by the light source 202.

In some examples the light sources 202 may be different to each other.

In some examples, the light sources 202 may be light emitting diodes. Such light emitting diodes may, for example, emit visible light or they may emit ultraviolet light.

In other examples, the light sources 202 may be lasers.

The light sources 202 may be coupled to the light conversion element 110 using a lens or an array of lenses, an optical fiber bundle or any other optical media that maps the array of light sources 202 to the input interface 120 and optionally to specific light guides 140.

Figure 8:
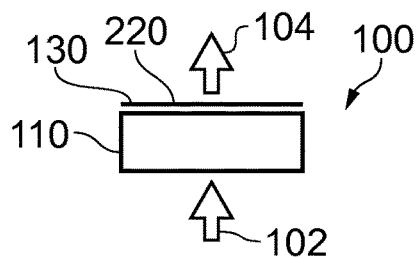
FIG. 8 illustrates an example of the apparatus comprising the light conversion element and an optical wavelength selective output element.

FIG. 8 illustrates an example of the apparatus 100 comprising not only the light conversion element 110 but in addition, comprising an optical wavelength selective output element 220. The optical wavelength selective output element 220 is associated with the output interface 130 of the light conversion element 110. The optical wavelength selective output element 220 is configured to enable output of the output light 104 that is produced by the down-conversion material 150 of the light conversion element 110 and to prevent output of the input light 102 from the output interface 130 of the light conversion element 110. The optical wavelength selective output element 220 therefore prevents output of the input light 102 that is used to stimulate the down-conversion material 150 and allows output of the output light 104 produced as a consequence of the stimulation of the down-conversion material 150.

Figure 9:
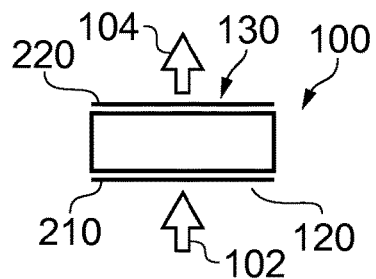
FIG. 9 illustrates an apparatus comprising the light conversion element, an optical wavelength selective output element and an optical wavelength selective input element.

FIG. 9 illustrates an apparatus 100 similar to that illustrated in FIG. 8, however, it additionally comprises an optical wavelength selective input element 210 associated with the input interface 120. The optical wavelength selective input element 210 is configured to enable input of the input light 102 to the light conversion element 110 and to prevent output of the output light 104 produced by the down-conversion material 150 of the light conversion element 110. The optical wavelength selective input element 210 therefore operates to prevent the loss of light produced by the down-conversion material other than through the output interface 130. For example, the optical wavelength selective input element 210 may be reflective to the output light 104 and may operate to reflect internally the light produced by the down-conversion material 150 from the input interface 120 towards the output interface 130.

The manufacture of optical wavelength selective elements is well documented in the literature and is not described further here.

Figure 10:
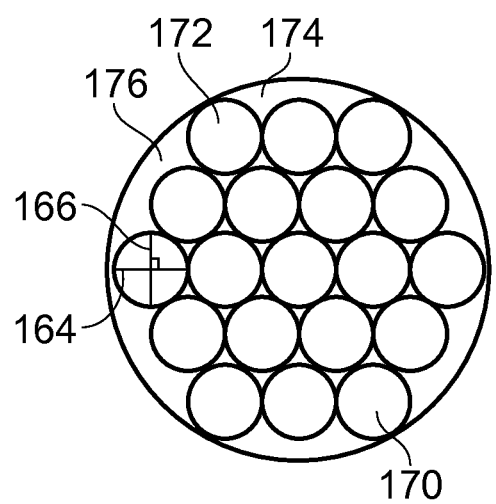
FIG. 10 illustrates an example of a fiber optic faceplate.

FIG. 10 illustrates an example of a fiber optic faceplate 176. The fiber optic faceplate 176 comprises a plurality of optical fibers 170. Each optical fiber 170 comprises a core portion 172 and a clad portion 174 of higher refractive index than the core portion 172.

The arrangement of optical fibers 170 within the fiber optic faceplate 176 is a closely packed bundle of optical fibers 170. Each of the optical fibers 170, in this example but not necessarily all examples, has a circular cross-section such that the cavities 160 have the same dimensions including a first cross-sectional dimension 164 in a first direction and a second cross-sectional dimension 166 in a second direction. The second direction being orthogonal to the first direction in the cross-section and the first dimension and the second dimension being substantially equal. This is true for any arbitrary direction within the cross-section as the cross-section is circular. The extent of the cavities 160 in a third dimension along the light guide 140 is only a part of the length of the light guide 140 such that there is thermally insulating material 172, 174 between the input interface 120 of the light guides 140 and the cavities 160. The core portion 172 is thermally insulating and the clad portion 174 is thermally insulating.

Figure 11:
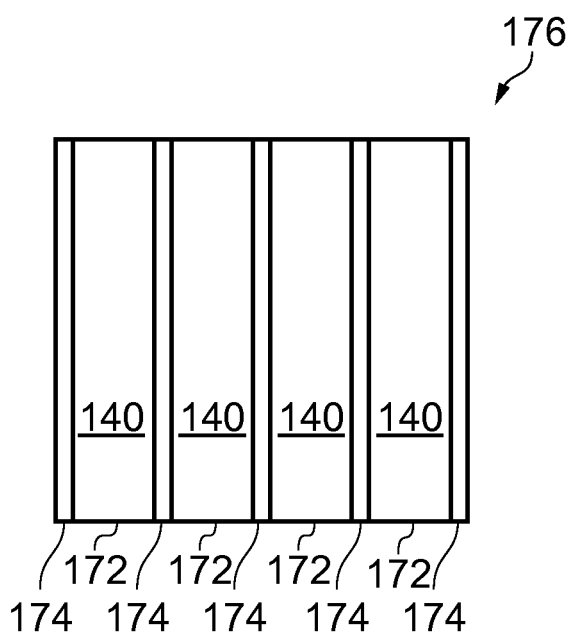
FIG. 11 illustrates a cross-section through a fiber optic faceplate before it has been manufactured into the light conversion element.

FIG. 11 illustrates a cross-section through a fiber optic faceplate 176 before it has been manufactured into the light conversion element 110 described above. The manufacturing process is illustrated in FIGS. 14 and 15.

Figure 14:
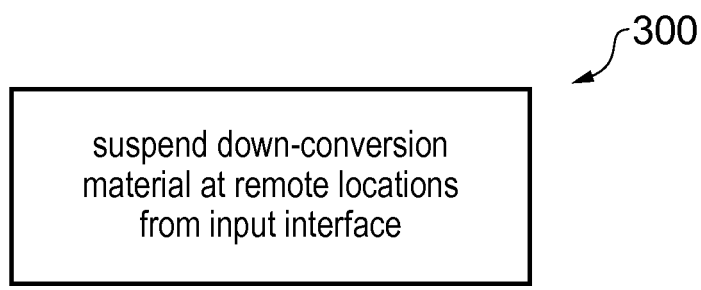
FIG. 14 illustrates a method.
Figure 15:
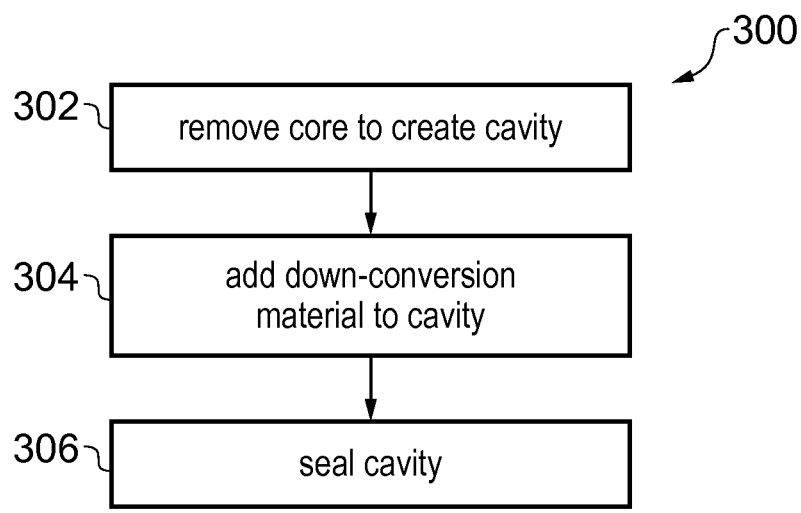
FIG. 15 illustrates a method of manufacturing a light conversion element from a fiber optic faceplate.

The overall purpose of the method 300 is illustrated in FIG. 14, namely to suspend down-conversion material 150 at remote locations from the input interface 120 of the light conversion element 110. This is achieved in relation to the fiber optic faceplate 176 as illustrated in FIG. 15.

At block 302, a portion of the cores 172 of the optical fibers 170 of the fiber optic faceplate 176 are removed from an extremity of the fiber optic faceplate 176. This extremity of the fiber optic faceplate 176 may be at an end of the fiber optic faceplate 176 that will be form the output interface 130 of the light conversion element 110 with the other extremity of the fiber optic faceplate forming the input interface 120.

Figure 12:
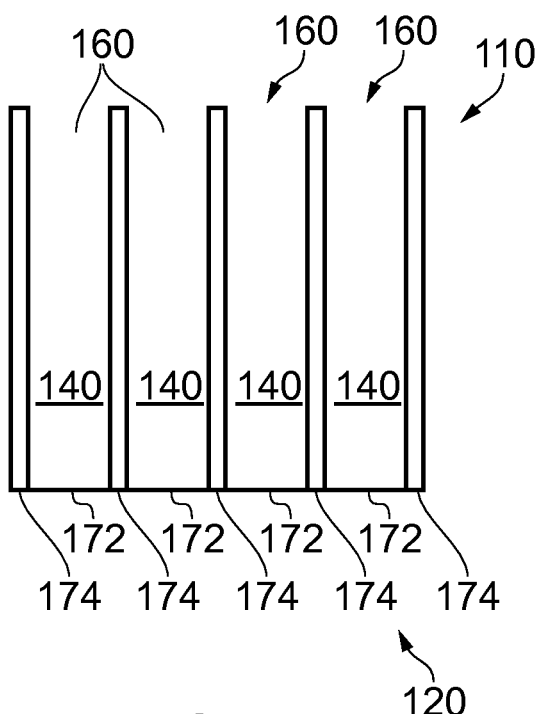
FIG. 12 illustrates a cross-section through a fiber optic faceplate during manufacture into the light conversion element.

As illustrated in FIG. 12, after block 302, an extremity of the fiber optic core 172 has been removed while retaining the extremity of the fiber optic clad 174 and the retained circumscribing fiber optic clad 174 forms a plurality of cavities 160.

Next at block 304, down-conversion material 150 is added to the cavities 160.

Next at block 306, the cavities 160 comprising the down-conversion material 150 are sealed to create an output interface 130 of the light conversion element 110. This seal may, in some examples, be an hermetic seal.

Figure 13:
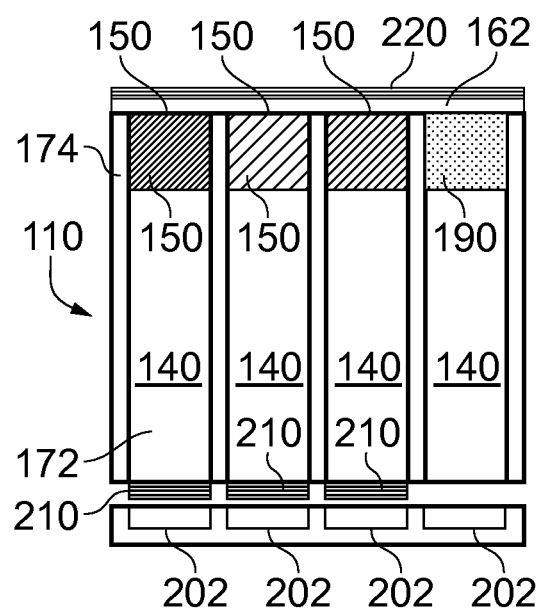
FIG. 13 illustrates a cross-section through a fiber optic faceplate after manufacture into the light conversion element.

As illustrated in FIG. 13, one or more optical wavelength selective output elements 220 may be associated with the output interface 130 of the light conversion element 110 and one or more optical wavelength selective input elements 210 may be associated with the input interface 120 of the light conversion element 110.

The light sources 202 may be associated with the light guides 140 to provide the input light 102.

In the example of FIG. 13, some of the cavities 160 comprise different down-conversion material 150. The output light 104 produced by the different down-conversion material 150 has different emission spectra. The input light 102 provided to the different down-conversion material 150 from the light sources 202 may be the same or may be different.

Also as illustrated in FIG. 13, it is possible for some of the cavities 160 to comprise diffusing material 190 instead of down-conversion material 150. Such diffusion material 190 may be used to diffuse light received at the input interface 120 of the light guide 140 from a light source 202'. In this example, the light source 202' is a light source that produces visible light.

It should be noted that the light source 202' is not associated with an optical wavelength selective input element 210 and that it is not necessary for the light guide 140 associated with the light source 202' to have an associated optical wavelength selective output element 220. This is because there is no conversion of light within the light guide 140 as it comprises diffusing material 190 rather than down-conversion material 150 and the input light 102 to that light guide 140 may be selected so that it comprises only desired wavelengths.

Although the light conversion element 110 has been described in the context of a display, it has broader application. It can also be used in programmable and configurable illuminators. In this case, groups of light sources 202 are driven independently by changing the current and/or pulse width modulation (PWM) duty. By placing different light conversion elements 110 in front of the light sources 202 the illuminator can be configured. In this way, different spectral sets of illumination are possible without replacing the light sources 202 themselves. One application of such an illuminator is a reconfigurable flash for a camera but it is also applicable to general lighting or special illuminators in the infrared spectrum.

Although the light conversion element 110 has been described in the context of a display, it has broader application. It can also be used for spectroscopic studies or other applications where the same or different wavelengths of light at provided to samples. The samples under investigation may be a part of the light conversion element 110, for example, placed in or adjacent the cavities on top of the down-conversion material 150. Alternatively the samples may be a part of a separate element which is aligned on top of the light conversion element 110. The light conversion element 110 provides spectral-to-spatial conversion and the samples can be exposed by spatial position to light of a large number of wavelengths simultaneously. The output can be captured by a camera and/or all channels can be combined for spectroscopic and/or fast temporal detection. The advantages over a broad-band light source and a dispersive element (e.g. prism) or diffractive grating light source is that spectral efficiency is much higher (there is no loss from zero or higher order diffractions). By modulating the exciting light sources 202 (e.g. UV/blue) differently, time-resolved spectroscopy is also possible. This is in contrast to conventional spectroscopy where the broadband light source modulates all outputs of the grating at the same time.

Although the light conversion element 110 has been described in the context of an emissive display, it is also possible to use the light conversion element 110 as a backlight for a liquid crystal display (LCD). The backlight light conversion element 110 may be divided into blocks which can be independently addressed, i.e. the backlight is effectively a low-resolution display on top of which a higher-resolution LCD is attached. In this way, dark areas appear darker (higher contrast), bright areas brighter (better highlights), and power consumption decreases. In some examples, each primary colour can be separately modulated. This would save more power and provide larger colour gamut.

In some examples, the light guides 140 may be made from glass or plastics. A light guide 140 may be made from any material which has transmittance at the wavelengths of interest, and a large enough difference between core 172 and clad 174 refractive indices in order to get good light guiding.

The light guides 140 may be made from a fiber optic faceplate 176 or alternatively loose optical fibers or bundles of optical fibers.

The ends of the light guides 140 may be dipped in the down-conversion material 150 suspending the light conversion material at a remote location from the input interface 120. The light guide ends may be assembled to a display or illuminator surface of any shape and size.

One input light source 202 may serve one or several cavities, and each of the several cavities may have different down-conversion material 150.

The term 'comprise' is used in this document with an inclusive not an exclusive meaning. That is any reference to X comprising Y indicates that X may comprise only one Y or may comprise more than one Y. If it is intended to use 'comprise' with an exclusive meaning then it will be made clear in the context by referring to "comprising only one." or by using "consisting".

In this brief description, reference has been made to various examples. The description of features or functions in relation to an example indicates that those features or functions are present in that example. The use of the term 'example' or 'for example' or 'may' in the text denotes, whether explicitly stated or not, that such features or functions are present in at least the described example, whether described as an example or not, and that they can be, but are not necessarily, present in some of or all other examples. Thus 'example', 'for example' or 'may' refers to a particular instance in a class of examples. A property of the instance can be a property of only that instance or a property of the class or a property of a sub-class of the class that includes some but not all of the instances in the class. It is therefore implicitly disclosed that a features described with reference to one example but not with reference to another example, can where possible be used in that other example but does not necessarily have to be used in that other example.

Although embodiments of the present invention have been described in the preceding paragraphs with reference to various examples, it should be appreciated that modifications to the examples given can be made without departing from the scope of the invention as claimed.

Features described in the preceding description may be used in combinations other than the combinations explicitly described.

Although functions have been described with reference to certain features, those functions may be performable by other features whether described or not.

Although features have been described with reference to certain embodiments, those features may also be present in other embodiments whether described or not.

Whilst endeavoring in the foregoing specification to draw attention to those features of the invention believed to be of particular importance it should be understood that the Applicant claims protection in respect of any patentable feature or combination of features hereinbefore referred to and/or shown in the drawings whether or not particular emphasis has been placed thereon.

I claim:

1. An apparatus comprising:
   a light conversion element comprising:
   an input interface for receiving input light;
   an output interface for providing output light having at least one different, lower frequency than the input light; and
   a plurality of light guides extending between the input interface and the output interface that suspend down-conversion material at remote locations from the input interface, wherein the down-conversion material is configured to down-convert the received input light to produce the provided output light of lower frequency or frequencies, and wherein the down-conversion material is housed in cavities, in the light guides, remote from and thermally insulated from the input interface.

2. An apparatus as claimed in claim 1, wherein the down-conversion material is suspended to form pixels or sub-pixels of a pixelated display.

3. An apparatus as claimed in claim 2, wherein an emission spectrum of light produced by a pixel or sub-pixel is controlled by at least a composition of the down-conversion material associated with that pixel or sub-pixel, wherein the apparatus comprises a plurality of different compositions of the down-conversion material associated with different pixels or sub-pixels.

4. An apparatus as claimed in claim 1, wherein the down-conversion material comprises phosphors and/or quantum dots.

5. An apparatus as claimed in claim 1, wherein the cavities are hermetically sealed.

6. An apparatus as claimed in claim 1, wherein the cavities have the same dimensions including a first cross-sectional dimension in a first direction, and a second dimension in a second cross-sectional direction, the second direction being orthogonal to the first direction in the cross-section wherein the first dimension and the second dimension are substantially equal.

7. An apparatus as claimed in claim 1, wherein the plurality of cavities are optically isolated by light absorbing material between the cavities.

8. An apparatus as claimed in claim 1, wherein each light guide is one or more optical fibers comprising a core portion and a clad portion of higher refractive index than the core portion, wherein each optical fiber is associated with a cavity comprising down-conversion material positioned at an extremity of a core portion circumscribed by the clad portion.

9. An apparatus as claimed in claim 1, wherein the light guides are provided by a fiber optic faceplate, modified at one extremity to remove fiber optic cores to form cavities for down-conversion material.

10. An apparatus as claimed in claim 1, further comprising a plurality of individually controllable light sources, each associated with one or more of the plurality of light guides.

11. An apparatus as claimed in claim 1, further comprising:
an optical wavelength selective input element associated with the input interface, configured to enable input of input light to the light conversion element and to prevent output of output light from the light conversion element and/or an optical wavelength selective output element associated with the output interface and configured to enable output of output light by the light conversion element and to prevent output of input light from the light conversion element.

12. An apparatus as claimed in claim 1, wherein a first plurality of the light guides are associated with optical wavelength selective input elements and/or optical wavelength selective output elements and a second plurality of the light guides are not associated with optical wavelength selective input elements or optical wavelength selective output elements, wherein the second plurality of light guides are configured to diffuse light guided from light sources.

13. A method comprising:
providing a light conversion element comprising:
an input interface for receiving input light; an output interface for providing output light; and a plurality of light guides extending between the input interface and the output interface;
suspending within the plurality of light guides down-conversion material at remote locations from the input interface, wherein the down-conversion material is configured to down-convert the received input light to produce the provided output light of lower frequency or frequencies, and wherein the down-conversion material is housed in cavities, in the light guides, remote from and thermally insulated from the input interface.

14. An method as claimed in claim 13, further comprising:
in a fiber optic faceplate, comprising fiber optics each having a core and a surrounding clad, removing at an extremity of the fiber optics a portion of the core, while retaining the clad, to form a plurality of cavities;
placing down-conversion material within the cavities; and
sealing the cavities.

* * * * *